United States Patent Office 2,784,209
Patented Mar. 5, 1957

2,784,209

REACTION PRODUCT OF TRIALKYL PHOSPHITE AND ACETIC ANHYDRIDE

Harry W. Coover, Jr., and Joseph B. Dickey, Kingsport, Tenn., assignors to Eastman Kodak Company, Rochester, N. Y., a corporation of New Jersey No Drawing. Application December 24, 1952,
Serial No. 327,925

9 Claims. (Cl. 260—461)

This invention relates to a process for the preparation of valuable organic phosphorus compounds. More particularly, this invention relates to the process of reacting a trialkylphosphite with an organic acid anhydride and to the phosphorus containing reaction products which have been found to be valuable insecticides.

We have discovered that trialkylphosphites react with organic acid anhydrides to give the corresponding alkyl ester of the organic acid anhydride plus an organic phosphorus compound containing a smaller number of alkyl groups per phosphorus molecule. The exact structure of these phosphorus compounds is not known. The reaction is applicable to all trialkylphosphites and organic acid anhydrides.

The conditions for running the reaction consist of mixing the desired quantities of trialkylphosphite and organic acid anhydride and heating until the required amount of organic acid ester is formed. In general, it is simplest to distill the ester from the reaction mixture as rapidly as it is formed. The reaction is greatly speeded up by the addition of small amounts of catalyst such as on the order of 0.001-1% of the organic and inorganic acids, the boron compounds or the metallic chlorides based on the weight of the mixture of trialkylphosphites and organic acid anhydrides, although in some cases as much catalyst as 5% may be employed. Although the reaction will progress in the absence of catalyst, we have found that ordinarily the best results are obtained when the reaction is speeded up and, hence, the use of catalyst is preferred. Organic and inorganic acids are good catalysts. Boron trifluoride, boron trifluoride etherate, boric acid esters and anhydrides and such compounds as stannic chloride, zinc chloride, and aluminum chloride are also very effective catalysts. We refer to these as "acid type" catalysts.

Accordingly, it is an object of our invention to provide a new process comprising the reaction of trialkylphosphites with organic acid anhydrides to provide new products having insecticidal and other valuable properties.

The invention will be further illustrated by the following examples which are given in an illustrative and not in a limiting sense:

*Example 1*

One-tenth mole of triethylphosphite and 0.1 mole of acetic anhydride and a trace of boron trifluoride etherate were placed in a distillation flask. The reaction mixture was heated in an oil bath at 150–160° C. (bath temperature) for 3 hours. At the end of this time, 0.1 mole of ethyl acetate had distilled from the reaction mixture. The remaining product was a clear slightly viscous liquid and was found to have insecticidal properties.

*Example 2*

One mole of tributylphosphite, 1 mole of acetic anhydride and a trace of concentrated sulfuric acid were placed in a distillation flask. The reaction mixture was heated in an oil bath at 175–180° C. (bath temperature) for 4–5 hours. At the end of this time 1 mole of butyl acetate had distilled from the reaction mixture. The reaction product was a light yellow liquid having insecticidal properties.

*Example 3*

One mole of trimethylphosphite, 1 mole of acetic anhydride and a trace of boric anhydride were placed in a distillation flask. The reaction mixture was heated in an oil bath at 150–160° C. (bath temperature) for 3 hours. At the end of this time 1 mole of methyl acetate had distilled from the reaction mixture. The remaining product was a clear liquid which was found to have good insecticidal properties.

Among the organic acids which can be used as catalysts in the reaction are the following: acetic, propionic, butyric, chloroacetic, trichloroacetic, trifluoroacetic, and the like.

Among the inorganic acids which can be used as catalysts in the reaction are the following: sulfuric, hydrochloric, hydrofluoric, boric, phosphoric, and the like.

While the reaction described herein is operative with other trialkyl phosphites, we prefer to use the lower alkyl compounds containing from one to four carbon atoms.

Examples of organic acid anhydrides useful in place of acetic anhydride are: propionic anhydride, butyric anhydride, chloroacetic anhydride, trichloroacetic anhydride, trifluoroacetic anhydride, and the like.

The insecticidal value of the organo-phosphorus compounds is shown by various tests carried out by contacting insects with these compounds. For instance, by preparing a dust of the organo-phosphorus compound in an inert carrier such as pyrophyllite, and after placing fruit flies in a bottle, sprinkling with the dust and observing the flies at intervals, it may be seen that 100% kill of these fruit flies is obtained in a short time. Another method of determining the effectiveness of this compound as an insecticide, is to dip a piece of filter paper into a solution of the compound in an organic solvent, allowing the paper to dry, and placing the same in a jar containing fruit flies. One hundred percent kill is obtained in a very short time with the organo-phosphorus compounds.

The insecticidal compositions in accordance with our invention are effective against various other insect pests such as house flies, silver fish, bean beetles, fleas, cucumber beetles, aphids, red spiders and other mites, thrips, etc.

We have found that petroleum distillates are particularly effective as solvents in preparing the organo-phosphorous insecticidal compositions, such as petroleum hydrocarbons having a boiling range of 80 to 150° C. For dusting compositions, we have found pyrophyllite to be of advantage as a carrier for the organo-phosphorus compounds.

The following examples illustrate compositions in accordance with our invention which are particularly effective for insecticidal purposes:

*Example 4*

The following is an example of insecticidal compositions in which other materials having insecticidal properties are incorporated:

| | Percent |
|---|---|
| Organo-phosphorus compound | 2.0 |
| Pyrethrin extract | 0.2 |
| Piperonyl butoxide | 1.0 |
| Petroleum distillate | 12.0 |
| Inert propellant | 84.8 |

*Example 5*

Instead of using a propellant, the composition of the organo-phosphorus compound in a pretroleum distillate may be emulsified in water by means of an emulsifying agent such as whale oil soap, ordinary soap, sodium lauryl sulfate, or the like.

*Example 6*

A particularly effective insecticidal dusting compound is obtained by incorporating 5–10% of the organo-phosphorus compound in 90–95% of pyrophyllite in a finely divided form.

We claim:

1. A process of preparing insecticidal organic phosphorus compounds, comprising heating together a trialkylphosphite, the alkyl being of 1–4 carbons, with acetic anhydride at about 150–180° C.
2. A process according to claim 1 carried out in contact with an acid type catalyst.
3. A process according to claim 1 wherein the phosphite is triethylphosphite.
4. A process according to claim 1 wherein the phosphite is tributylphosphite.
5. A process according to claim 1 wherein the phosphite is trimethylphosphite.
6. An organic phosphorus compound formed along with the alkyl ester of the acid anhydride by the reaction of a trialkylphosphite, the alkyls being of 1–4 carbons, with acetic anhydride at about 150–180° C.
7. An organic phosphorus compound formed along with ethyl acetate by the reaction of triethylphosphite with acetic anhydride at about 150–180° C.
8. An organic phosphorus compound formed along with the butyl acetate by the reaction of tributylphosphite with acetic anhydride at about 150–180° C.
9. An organic phosphorus compound formed along with the methyl acetate by the reaction of trimethylphosphite with acetic anhydride at about 150–180° C.

References Cited in the file of this patent
UNITED STATES PATENTS

| | | |
|---|---|---|
| 2,573,568 | Harman et al. | Oct. 30, 1951 |
| 2,600,378 | Dickey et al. | June 17, 1952 |